United States Patent
Grant et al.

(10) Patent No.: US 9,181,886 B2
(45) Date of Patent: Nov. 10, 2015

(54) DUAL FUEL COMMON RAIL TRANSIENT PRESSURE CONTROL AND ENGINE USING SAME

(71) Applicant: Caterpillar, Inc., Peoria, IL (US)

(72) Inventors: Steven Thomas Grant, Groveland, IL (US); Frank Lombardi, Metamora, IL (US); Daniel R. Puckett, Peoria, IL (US); Cory Brown, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 364 days.

(21) Appl. No.: 13/889,574

(22) Filed: May 8, 2013

(65) Prior Publication Data
US 2014/0331963 A1 Nov. 13, 2014

(51) Int. Cl.
| F02M 43/00 | (2006.01) |
| F02D 41/00 | (2006.01) |
| F02D 41/10 | (2006.01) |
| F02D 41/38 | (2006.01) |
| F02D 19/10 | (2006.01) |
| F02D 19/06 | (2006.01) |

(52) U.S. Cl.
CPC .......... *F02D 41/0025* (2013.01); *F02D 19/061* (2013.01); *F02D 19/0605* (2013.01); *F02D 19/0694* (2013.01); *F02D 19/10* (2013.01); *F02D 41/10* (2013.01); *F02D 41/3845* (2013.01); *F02D 41/0027* (2013.01); *F02D 2041/3881* (2013.01)

(58) Field of Classification Search
CPC ........ F02D 41/0027; F02D 19/08; F02B 1/12
USPC ............. 123/27 GE, 299, 304, 379, 382, 387, 123/525, 526
See application file for complete search history.

(56) References Cited

U.S. PATENT DOCUMENTS

| 5,713,340 A | 2/1998 | Vandenberghe et al. |
| 7,007,661 B2 | 3/2006 | Warlick |
| 2011/0288751 A1 | 11/2011 | Kurtz |
| 2012/0285417 A1 | 11/2012 | Kim et al. |
| 2014/0238352 A1* | 8/2014 | Methil et al. .................. 123/456 |
| 2014/0311454 A1* | 10/2014 | Pursifull et al. .............. 123/468 |

FOREIGN PATENT DOCUMENTS

| WO | 2012057691 | 5/2012 |
| WO | 2012080568 | 6/2012 |

* cited by examiner

*Primary Examiner* — John Kwon
(74) *Attorney, Agent, or Firm* — Liell & McNeil Attorneys, PC

(57) ABSTRACT

A compression ignition engine is fueled from common rail fuel injectors that predominately inject natural gas fuel that is compression ignited with a small pilot injection of liquid diesel fuel. Before and after a rapid fueling increase transient, the liquid and gaseous rail pressures are controlled toward respective pressures based upon engine speed and load. During the transient, the liquid rail pressure is controlled toward an elevated liquid pressure in order to cause a surge in the supply of gaseous fuel to the gaseous fuel common rail to proactively satisfy the increased gaseous fuel injection rate while obviating a substantial pressure deficit in the gaseous fuel common rail.

20 Claims, 6 Drawing Sheets

US 9,181,886 B2

DUAL FUEL COMMON RAIL TRANSIENT PRESSURE CONTROL AND ENGINE USING SAME

TECHNICAL FIELD

The present disclosure relates generally to dual fuel compression ignition engines, and more particularly to a common rail pressure control strategy during a fueling increase transient.

BACKGROUND

Natural gas is increasingly becoming an attractive alternative for fueling internal combustion engines. In one specific example, a compression ignition engine is fueled predominately with natural gas originating from a gaseous fuel common rail, and liquid diesel fuel from a liquid fuel common rail that are directly injected into each engine cylinder. Both fuels are injected from the same fuel injector, and the relatively large charge of gaseous fuel is ignited by compression igniting a small pilot injection quantity of liquid diesel fuel. Co-owned U.S. Patent Application Publication No. 2012/0285417 shows an example of such a dual fuel system. During typical operation, the liquid fuel pressure is maintained greater than the gaseous fuel pressure to inhibit migration of gaseous fuel into the liquid fuel side of the fuel system. Pressure in the liquid fuel common rail can be changed quickly due to the relative incompressibility of the liquid fuel. However, changing, and sometimes sustaining, pressure in the gaseous fuel common rail is far different, and often more problematic, due to the highly compressible nature of the gaseous fuel.

The present disclosure is directed toward one or more of the problems set forth above.

SUMMARY

In one aspect, a method of operating an engine includes injecting gaseous fuel and liquid fuel directly into an engine cylinder from a gaseous nozzle outlet set and a liquid nozzle outlet set, respectively, of a fuel injector. The injected liquid fuel is compression ignited to in turn ignite the gaseous fuel. A transient is commanded from a low fuel demand of a first speed and load to a high fuel demand of a second speed and load. A gas rail pressure deficit is obviated during the transient by proactively increasing a mass flow rate of a gaseous fuel to a gaseous fuel common rail responsive to the commanding step.

In another aspect, an engine includes an engine housing that defines a plurality of cylinders in which a plurality of respective pistons reciprocate to define a compression ratio greater that 14:1. A gaseous fuel common rail and a liquid fuel common rail are fluidly connected to each of a plurality of fuel injectors that each include a gaseous nozzle outlet set and a liquid nozzle outlet set positioned for direct injection into one of the cylinders. An electronic controller is configured to execute a feel forward transient control algorithm responsive to a commanded transient. The feed forward transient control algorithm is configured to obviate a deficit in a gaseous rail pressure during the transient by proactively increasing a mass flow rate of gaseous fuel to the gaseous fuel common rail. The transient includes changing from a low fuel demand of a first speed and load to a high fuel demand of a second speed and load.

DETAILED DESCRIPTION

Figure 1:
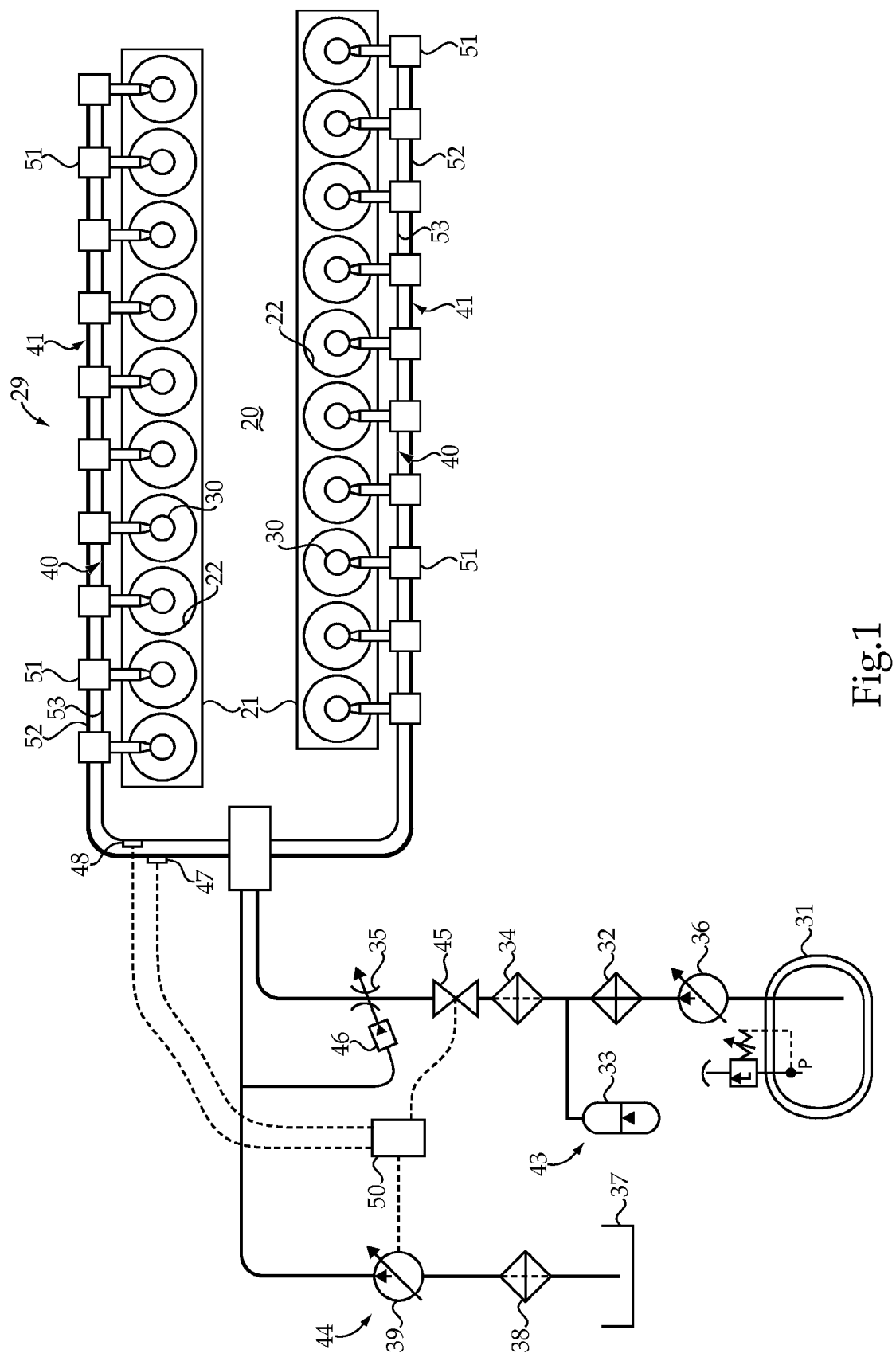
FIG. 1 is a schematic view of an engine according to an aspect of the present disclosure.
Figure 2:
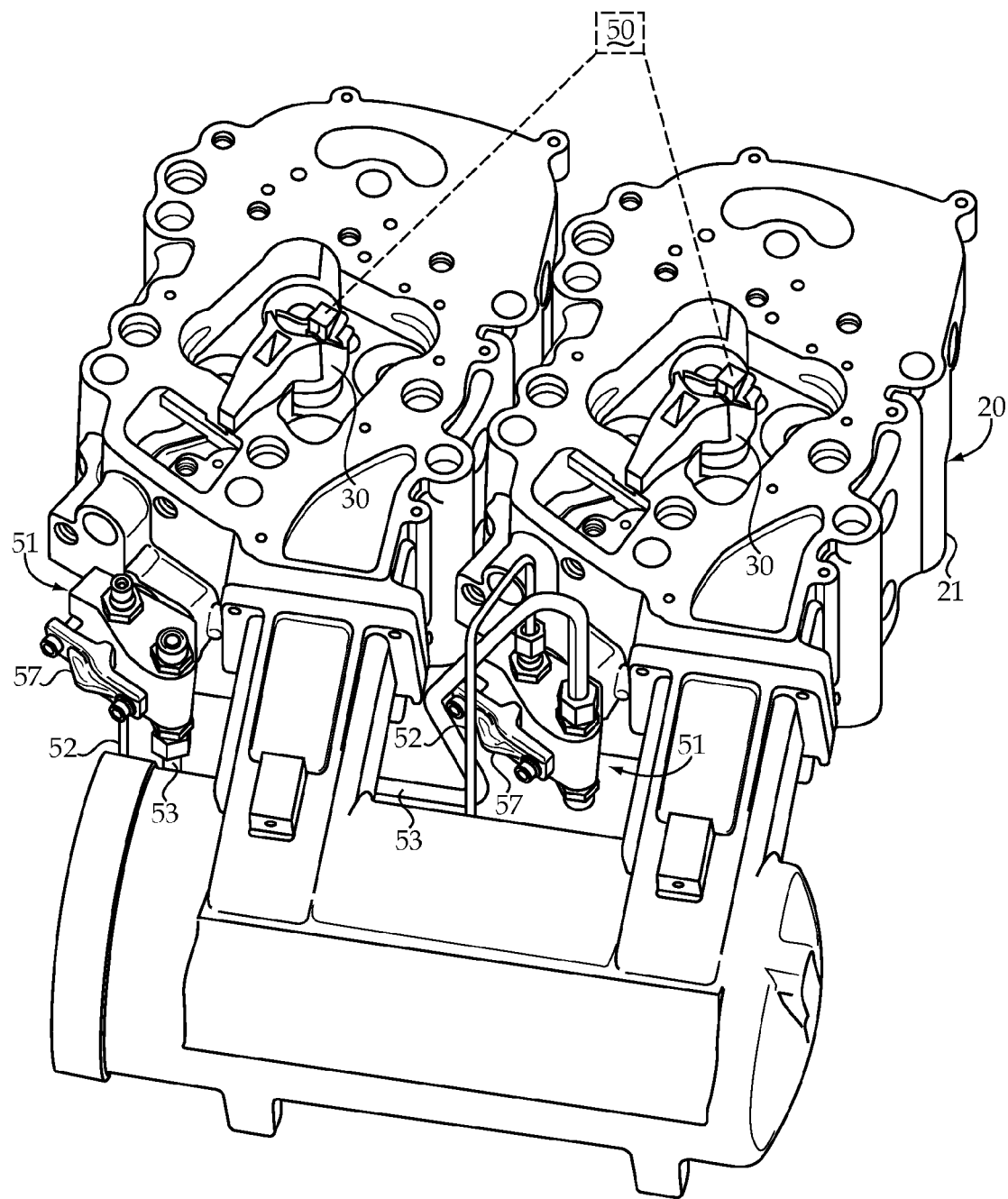
FIG. 2 is a perspective view of a portion of the engine shown in FIG. 2.
Figure 3:
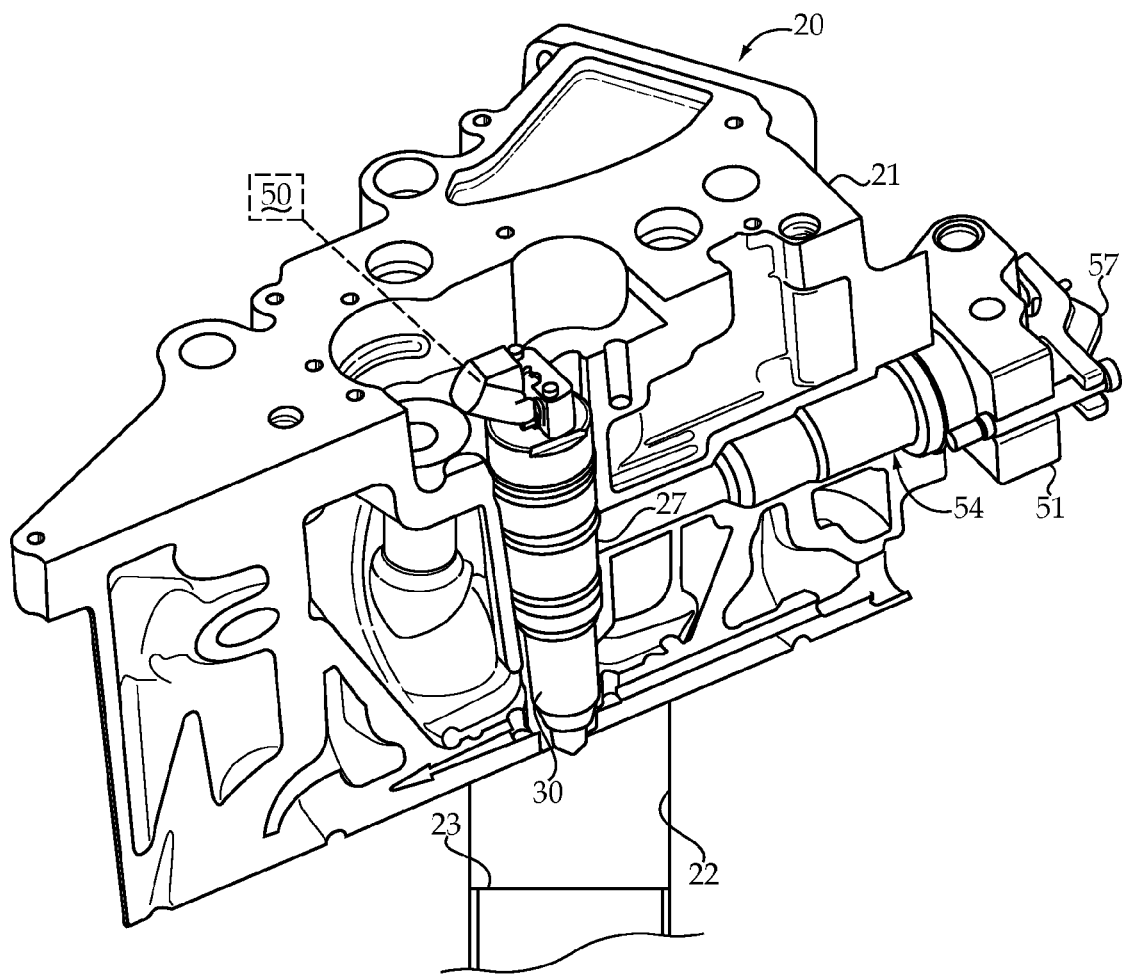
FIG. 3 is a sectioned perspective view through a portion of the engine shown in FIG. 2.

Referring initially to FIGS. 1-4, a dual fuel engine 20 includes an engine housing 21 that defines a plurality of engine cylinders 22. A piston 23 reciprocates in each of the cylinders 22 to define a compression ratio greater than 14:1, which is generally associated with a compression ratio suitable for compression igniting injected liquid diesel fuel. In the illustrated embodiment, engine 20 includes twenty engine cylinders 22. However, those skilled in the art will appreciate that an engine with any number of cylinders would also fall within the intended scope of the present disclosure. A dual fuel common rail system 29 includes exactly one fuel injector 30 positioned for direct injection into each of the plurality of engine cylinders 22. The dual fuel common rail system 29 includes a gaseous fuel common rail 40 and a liquid fuel common rail 41 that are fluidly connected to a gaseous fuel inlet 101 and a liquid fuel inlet 102, respectively, of each fuel injector 30. The dual fuel common rail system 29 includes gas supply devices 43 that supply gaseous fuel to the gaseous fuel common rail 40. The gas supply devices 43 may include a pressurized cryogenic liquid natural gas tank 31 with an outlet fluidly connected to a variable delivery cryogenic pump 36, and may also include a heat exchanger 32 (vaporizer), an accumulator 33 and a gas filter 34. A metering valve 35, which could be dome regulator valve, may be included to control a mass flow rate of gaseous fuel to the gaseous fuel common rail 40 by changing a variable flow area. This strategy also inherently controls the pressure in gaseous fuel common rail 40. In the illustrated embodiment, the pressure of gaseous fuel in gaseous fuel common rail 40 is controlled responsive to pressure in the liquid fuel common rail 41 using a pressure actuator 46 that changes a variable flow area through the metering valve 35 via a fluid connection to liquid fuel common rail 41. Although the gaseous rail pressure is shown as being regulated hydro-mechanically, responsive to pressure in the liquid fuel common rail, those skilled in the art will appreciate that other strategies could be used for controlling pressure in the gaseous fuel common rail 40. For instance, an electronically controlled valve could be substituted in place of the metering valve 35 shown without departing from the present disclosure. In the illustrated embodiment, it may be desirable to calibrate metering valve 35 in order to control the gas rail pressure toward a pressure that is lower than the liquid rail pressure in order to inhibit migration of gaseous fuel into the liquid fuel. A shutoff valve 45 may be located to isolate gaseous fuel common rail 40 from the gaseous fuel supply devices 43, namely the accumulator 33 and cryogenic pump 36. Liquid supply and pressure control devices 44 may include a diesel fuel tank 37, fuel filters 38 and an electronically controlled high pressure fuel pump 39 that supplies liquid fuel to, and controls pressure in, liquid fuel common rail 41. An electronic controller 50 may be in control communication with shutdown valve 45, the liquid supply and pressure control devices 44, the gaseous supply devices 43 as well as each of the fuel injectors 30. Pressure sensors 47 and 48 may communicate liquid and gaseous fuel pressures, respectively, to electronic controller 50.

Although not necessary, the gaseous fuel common rail 40 and the liquid fuel common rail 41 may be made up of a plurality of daisy chained blocks 51 that are connected in series with liquid fuel lines 52 and gaseous fuel lines 53. The liquid and gaseous fuels may be supplied to the individual fuel injectors 30 with a coaxial quill assembly 54 that includes an inner quill 55 that is positioned within an outer quill 56. Liquid fuel is supplied to the fuel injector 30 through inner quill 55, and gaseous fuel is supplied to fuel injector 30 in the space between inner quill 55 and outer quill 54. A load adjusting clamp 57 may be utilized with each block 51 for pushing the coaxial quill assembly 54 so that both the inner quill 55 and the outer quill 56 seat on a common conical seat 27 of each fuel injector 30.

Figure 4:
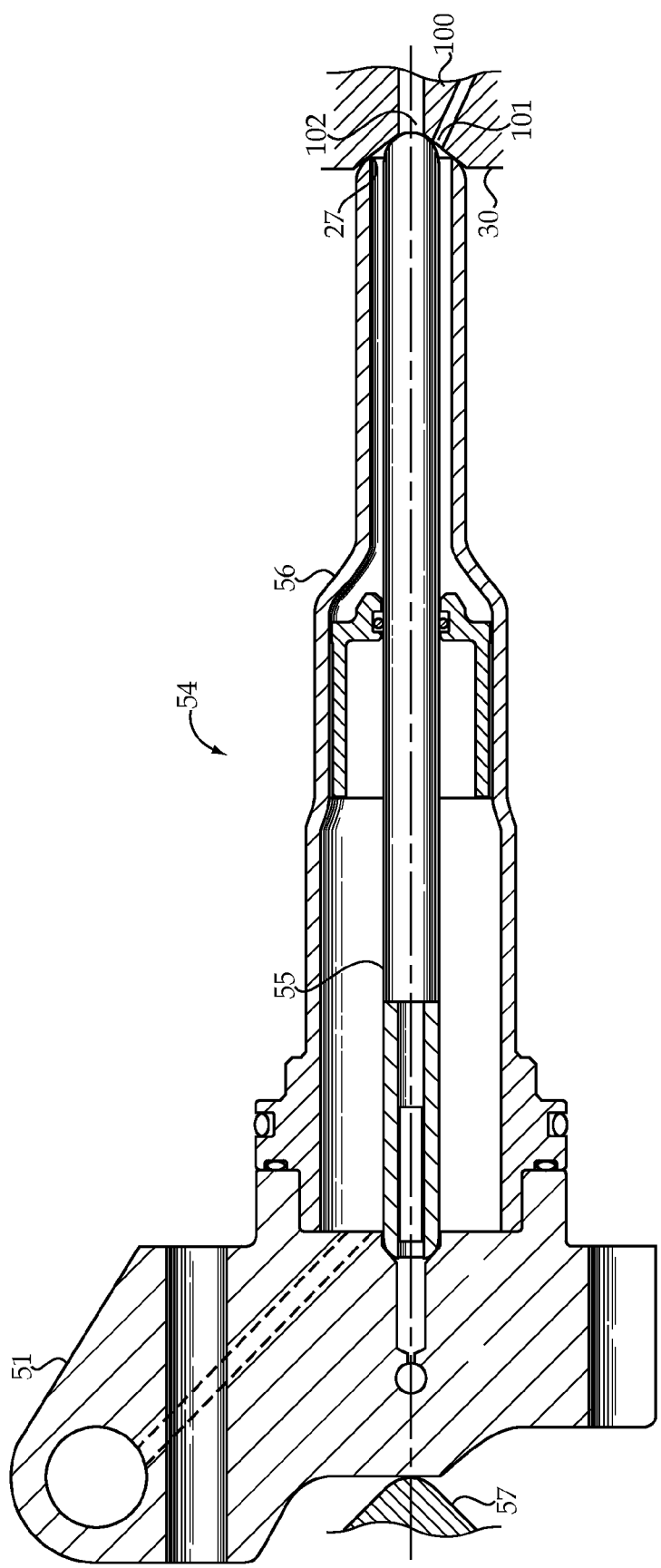
FIG. 4 is a sectioned side view of a concentric quill assembly for supplying gaseous and liquid fuels to individual fuel injectors.
Figure 5:
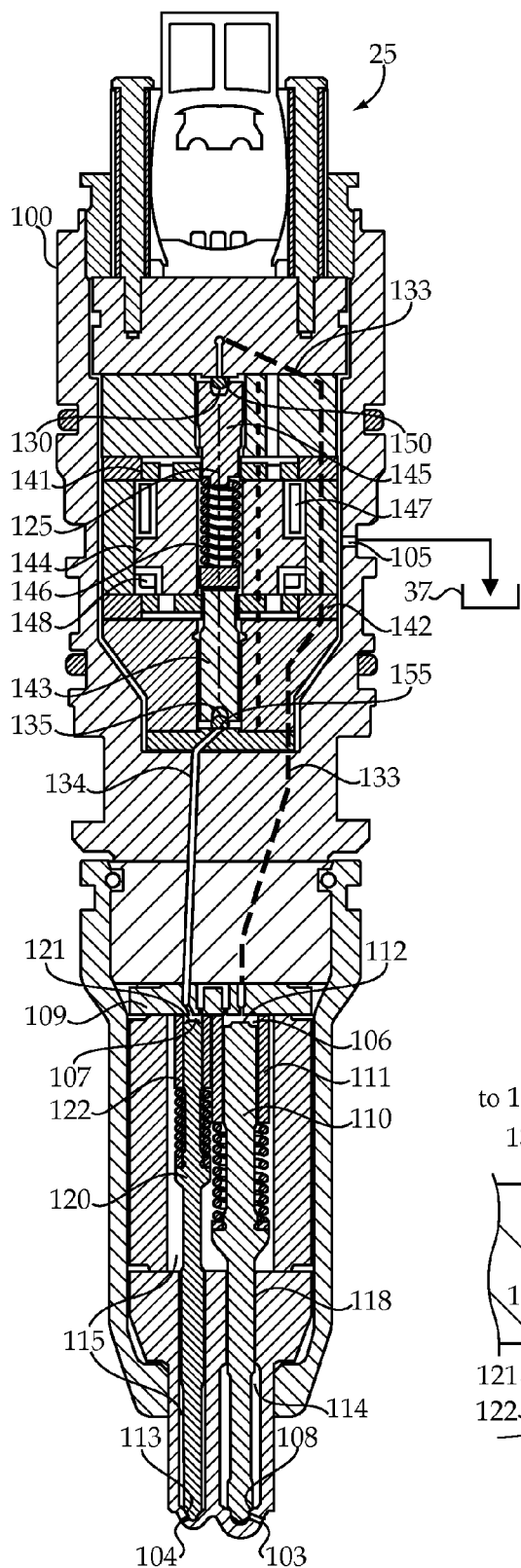
FIG. 5 is a front sectioned view of a fuel injector for the engine of FIGS. 2-5.
Figure 6:
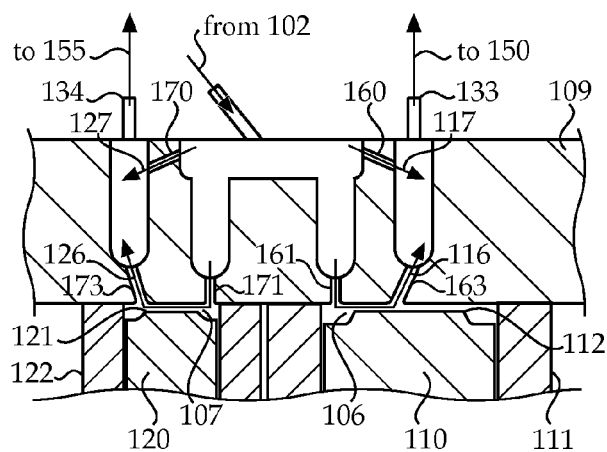
FIG. 6 is an enlarged sectioned view of a control portion of the fuel injector of FIG. 5.

Referring in addition to FIGS. 5 and 6, an example fuel injector 30 for use in the engine 20 is illustrated. Fuel injector 30 includes an injector body 100 that defines a gaseous fuel inlet 101 for gaseous fuel and a liquid fuel inlet 102 for liquid fuel that both open through common conical seat 27 (FIG. 4). The gaseous fuel inlet 101 is fluidly connected to a gaseous nozzle chamber 114 disposed within injector body 100 via a passageway not visible in the sectioned view of FIG. 5. Likewise, the liquid fuel inlet 102 is fluidly connected to a liquid nozzle chamber 115 via a passageway not visible in the sectioned view of FIG. 5. In the embodiment shown, the liquid nozzle chamber 115 is separated from the gaseous nozzle chamber 114 by a check guide area 118 associated with gaseous check valve member 110. Although other locations exist, such as where the coaxial quill 54 contacts the common conical seat 27 of injector body 100, migration of one fuel into the other fuel is possible in the guide clearance that exists in check guide area 118. Migration of gaseous fuel from gaseous nozzle chamber 114 into liquid nozzle chamber 115 can be inhibited by maintaining the liquid fuel pressure in liquid fuel common rail 41 higher than the pressure in gaseous fuel common rail 40. For instance, at rated conditions, the liquid fuel rail 41 might be maintained at about 40 MPa, whereas the gaseous fuel common rail might be maintained at about 35 MPa. At idle, the respective liquid and gas rail pressures might be maintained at 25 and 20 MPa, respectively. This pressure differential may inhibit gaseous fuel from migrating into the liquid fuel, but may permit a small amount of liquid fuel to migrate along guide area 118 from liquid nozzle chamber 115 to gaseous nozzle chamber 114. This small amount of leakage may be beneficial for lubricating both the check guide area 118 and the seat 108 associated with gaseous check valve member 110.

Injector body 100 defines a gaseous nozzle outlet set 103, a liquid nozzle outlet set 104 and a drain outlet 105. Disposed within injector body 100 are a first control chamber 106 and a second control chamber 107. A gaseous check valve member 110 has a closing hydraulic surface 112 exposed to fluid pressure in the first control chamber 106. The gaseous check valve member 110 is movable between a closed position, as shown, in contact with a first nozzle seat 108 to fluidly block the gaseous fuel inlet 101 to the gaseous nozzle outlet set 103, and an open position out of contact with the first nozzle seat 108 to fluidly connect the gaseous fuel inlet 101 to the gaseous nozzle outlet set 103. First control chamber 106 may be partially defined by a first sleeve 111.

A liquid check valve member 120 has a closing hydraulic surface 121 exposed to fluid pressure in the second control chamber 107. The liquid check valve member 120 is movable between a closed position, as shown, in contact with a second nozzle seat 113 to fluidly block the liquid fuel inlet 102 to the liquid nozzle outlet set 104, and an open position out of contact with the second nozzle seat 113 to fluidly connect the liquid fuel inlet 102 to the liquid nozzle outlet set 104. The second control chamber 107 may be partially defined by a second sleeve 122. Thus, injection of gaseous fuel through gaseous nozzle outlet set 103 is facilitated by movement of gaseous check valve member 110, while injection of a liquid fuel through liquid nozzle outlet set 104 is facilitated by movement of the liquid check valve member 120.

A first control valve member 130 is positioned in injector body 100 and is movable along a common centerline 125 between a first position in contact with first valve seat 150 at which the first control chamber 106 is fluidly blocked to the drain outlet 105, and a second position at which the first control chamber 106 is fluidly connected to the drain outlet 105. When first control chamber 106 is fluidly connected to drain outlet 105, pressure in first control chamber 106 drops, relieving pressure on closing hydraulic surface 112 to allow gaseous check valve member 110 to lift to facilitate an injection of the gaseous fuel through gaseous nozzle outlet set 103. A second control valve member 135 is positioned in the injector body 100 and movable along the common centerline 125 between a first position in contact with second valve seat 155 at which the second control chamber 107 is fluidly blocked to the drain outlet 105, and a second position at which the second control chamber 107 is fluidly connected to the drain outlet 105. When second control chamber 107 is fluidly connected to drain outlet 105, fluid pressure acting on closing hydraulic surface 121 is relieved to allow liquid check valve member 120 to lift to an open position to facilitate injection of the liquid diesel fuel through the liquid nozzle outlet set 104.

In the illustrated embodiment, the first and second control valve members 130, 135 are intersected by the common centerline 125. The respective control valve members 130, 135 may be moved to one of their respective first and second positions with first and second electrical actuators that include first and second coils 147, 148, respectively. The control valve members 130, 135 may be biased to the their respective first positions by a shared biasing spring 146. A first armature 141 may be attached to a pusher 145 in contact with first control valve member 130. A second armature 142 may be operably coupled to move the second control valve member 135 by way of a pusher 143. A shared stator 144 houses first and second coils 147, 148 and separates the first armature 141 from the second armature 142.

In the illustrated embodiment, the first control chamber 106 may always be fluidly connected to the high pressure in the liquid fuel inlet 102 via an F orifice 160 and a Z orifice 161. The upstream ends of respective F and Z orifices 160 and 161 may be fluidly connected to the liquid fuel inlet 102 via passages not visible in the sectioned views. The first control chamber 106 is fluidly connected to a control passage 133 via a so called A orifice 163. Thus, when first control valve member 130 lifts off of first valve seat 150, the second fuel inlet 102 becomes fluidly connected to the drain outlet 105 through a Z-A pathway 116 and an F pathway 117 that are fluidly in parallel with each other.

The second control chamber 107 may always be fluidly connected to the high pressure in liquid fuel inlet 102 via an F orifice 170 and a Z orifice 171. The upstream ends of respective F and Z orifices 170, 171 may be fluidly connected to the liquid fuel inlet 102 via passages not visible in the sectioned view. The second control chamber 107 is fluidly connected to a control passage 134 via a so-called A orifice 173. Thus, when the second control valve member 135 moves off of the second valve seat 155, the second fuel inlet 102 becomes fluidly connected to the drain outlet 105 through a Z-A pathway 126 and an F pathway 127 that are fluidly in parallel with each other.

Those skilled in the art will appreciate that the illustrated embodiment utilizes liquid diesel fuel to control movement of the gaseous check valve member 110 and the liquid check valve member 120 to facilitate control over gaseous fuel injection events and liquid diesel fuel injection events, respectively. Other control strategies would also fall within the scope of the present disclosure.

Apart from electronic controller 50 including various control algorithms for operating engine 20 in dual fuel modes at various speeds and loads, the present disclosure also teaches equipping the electronic controller with a special strategy for obviating a deficit in gas rail pressure during certain transients. Although those skilled in the art will appreciate that many different engine transitions exist, a transient according to the present disclosure includes changing from a low fuel demand of a first speed and load to a high fuel demand of a second speed and load. The terms low and high should be interpreted relative to each other rather than in terms of a complete operating range for engine 20. In general, a transient according to the present disclosure relates to an increase in fueling demand of a magnitude that occurs sufficiently abruptly that normal control strategies could result in a temporary mismatch between the mass flow of gaseous fuel being supplied to the gaseous fuel common rail 40 and the mass rate of injection of gaseous fuel brought about by the transient. In other words, the present disclosure recognizes that the highly compressible nature of gaseous fuel and the choices made with regard to the gaseous fuel supply devices 43 and pressure control with metering valve 35, and the expected time lags associated with the same, could result in a substantial deficit in gaseous rail pressure during transients in which increased fueling is necessary to change the engine from a first speed and load to a second speed and load. A gas pressure deficit should be interpreted relative to a desired gas pressure at any given instant. Thus, the present disclosure would teach obviating a deficit in gaseous rail pressure during the transient by proactively increasing a mass flow rate of gaseous fuel to the gaseous fuel common rail 40 responsive to commanding a transient from a low fuel demand of a first speed and load to a high fuel demand of a second speed and load. "Obviating" in the context of the present disclosure does not mean absolute prevention. Thus, some gas pressure deficit could occur when utilizing the teachings of the present disclosure. In order to accomplish this task, electronic controller 50 may be configured to execute a feed forward transient control algorithm responsive to a commanded transient. The feed forward transient control algorithm would be configured to obviate a deficit in gaseous rail pressure during the transient by proactively increasing a mass flow rate of gaseous fuel to the gaseous fuel common rail 40. In the illustrated embodiment, the flow of gaseous fuel to gaseous fuel common rail 40 is controlled responsive to the liquid pressure in liquid common rail 41. Thus, in the embodiment illustrated in FIG. 1, the supply of gaseous fuel to the gaseous fuel common rail 40 can be surged by temporarily raising the pressure in the liquid fuel common rail 41.

Typically, the liquid rail pressure is controlled toward a target liquid pressure that is based upon engine speed and load. For instance, electronic controller 50 may include stored maps of target liquid rail pressures for different speeds and loads across the engine's operating range. The present disclosure recognizes that maintaining this liquid rail pressure control strategy during a fueling increase transient may result in the increased gaseous fuel injection mass rate to temporarily outrun the rate at which gaseous fuel is resupplied to the gaseous fuel common rail 40, causing a pressure deficit therein. Thus, the present disclosure in the context of the illustrated embodiment would teach controlling the liquid rail pressure toward a temporary elevated target pressure during the transient in order to temporarily increase a variable flow area through the metering valve 35. Thus, the liquid rail pressure may be controlled toward a first liquid rail pressure based upon a first speed and load prior to the transient, and be controlled toward a second liquid rail pressure based on a second speed and load after the transient. However, the feed forward transient control algorithm may be configured to control the liquid rail pressure toward a third liquid rail pressure, which is greater than the first liquid rail pressure and the greater than the second liquid rail pressure, during the transient. In an alternative version of the present disclosure, the pressure in gaseous fuel common rail 40 may be controlled with hardware and logic that is independent of the liquid fuel common rail 41. In such a case, the surge in the gaseous fuel supply to the gaseous fuel common rail 40 might be accomplished by an appropriate control signal communicated from electronic controller 50 to an electronically controlled metering valve fluidly positioned between the gaseous fuel supply system 43 and the gaseous fuel common rail 41, with or without altering the liquid rail pressure.

Before, during and after a transient, the present disclosure may generally seek to size liquid injection events to correspond to a predetermined minimum controllable injection quantity, and allocate a remainder of an engine fuel demand to gaseous injection events. A minimum controllable injection quantity according to the present disclosure means the predetermined control signal associated with the minimum injection quantity at a given liquid rail pressure. Those skilled in the art will appreciate that smaller injection quantities might be possible but may have an unacceptable variance rendering them unsuitable in preparing engine control maps.

INDUSTRIAL APPLICABILITY

The present disclosure applies broadly to any engine that utilizes two fluidly distinct common rails to deliver gaseous and liquid fuels to a single fuel injector associated with each engine cylinder. The present disclosure is specifically applicable to a strategy for controlling pressures in the common rails as part of a transient pressure control strategy. Finally, the present disclosure is directed to a fueling increase transient strategy to obviate deficits in gaseous rail pressure during a transient.

Gaseous fuel is supplied from the gaseous fuel common rail 40 to each of the plurality of fuel injectors 30 by a respective co-axial quill assembly 54. Likewise, liquid fuel from a liquid fuel common rail 41 is supplied to each of the plurality of fuel injectors 30 by the same respective co-axial quill assemblies 54. When in operation, gaseous fuel is injected from each fuel injector 30 into an engine cylinder 22 responsive to a gaseous fuel injection signal communicated from electronic controller 50 to the fuel injector 30. In particular, a gaseous fuel injection event is initiated by energizing the upper electrical actuator (upper coil 147) to move armature 141 and first control valve member 130 downward out of contact with first valve seat 150. This fluidly connects control chamber 106 to drain outlet 105 to reduce pressure acting on closing hydraulic surface 112. The gaseous fuel check valve member 110 then lifts out of contact with first nozzle seat 108 to commence spray of gaseous fuel out of gaseous nozzle outlet set 103. The injection event is ended by de-energizing the upper electrical actuator to allow armature 141 and control valve member 130 to move upward under the action of spring 146 back into contact to close first valve seat 150. When this occurs, pressure abruptly rises in control chamber 106 acting on closing hydraulic surface 112 to push gaseous check valve member 110 back downward into contact with seat 108 to end the gaseous fuel injection event.

Also, liquid fuel from the fuel injector 30 is injected directly into engine cylinder 22 from the same fuel injector 30 responsive to a liquid fuel injection signal from electronic controller 50. In particular, a liquid fuel injection event is initiated by energizing the lower coil 148 to move armature 142 upward along common centerline 125. This causes pusher 143 to move second control valve member 135 out of contact with second valve seat 155. This in turn relieves pressure in control chamber 107 allowing liquid check valve member 120 to lift out of contact with second nozzle seat 113 to commence a liquid fuel injection event out of liquid nozzle outlet set 104. To end the liquid injection event, the lower electrical actuator (lower coil 148) is de-energized. When this is done, shared biasing spring 146 pushes armature 142 and second control valve member 135 back up into contact with second valve seat 155 to close the fluid connection between control chamber 107 and drain outlet 105. When this is done, pressure acting on closing hydraulic surface 121 quickly rises causing liquid check valve member 120 to move downward and back into contact with second nozzle seat 113 to end the liquid fuel injection event. Both liquid and natural gas injection events are ended by fluidly connecting the respective control chambers 107, 106 to the liquid fuel common rail 22 through respective F orifices 160, 170, and Z orifices 161, 171 that are fluidly in parallel.

Because of its high compression ratio (greater than 14:1) the injected liquid fuel will compression ignite in each of the respective engine cylinders 22. The injected gaseous fuel is ignited in a respective one of the engine cylinders responsive to the compression ignition of the liquid fuel.

Figure 7:
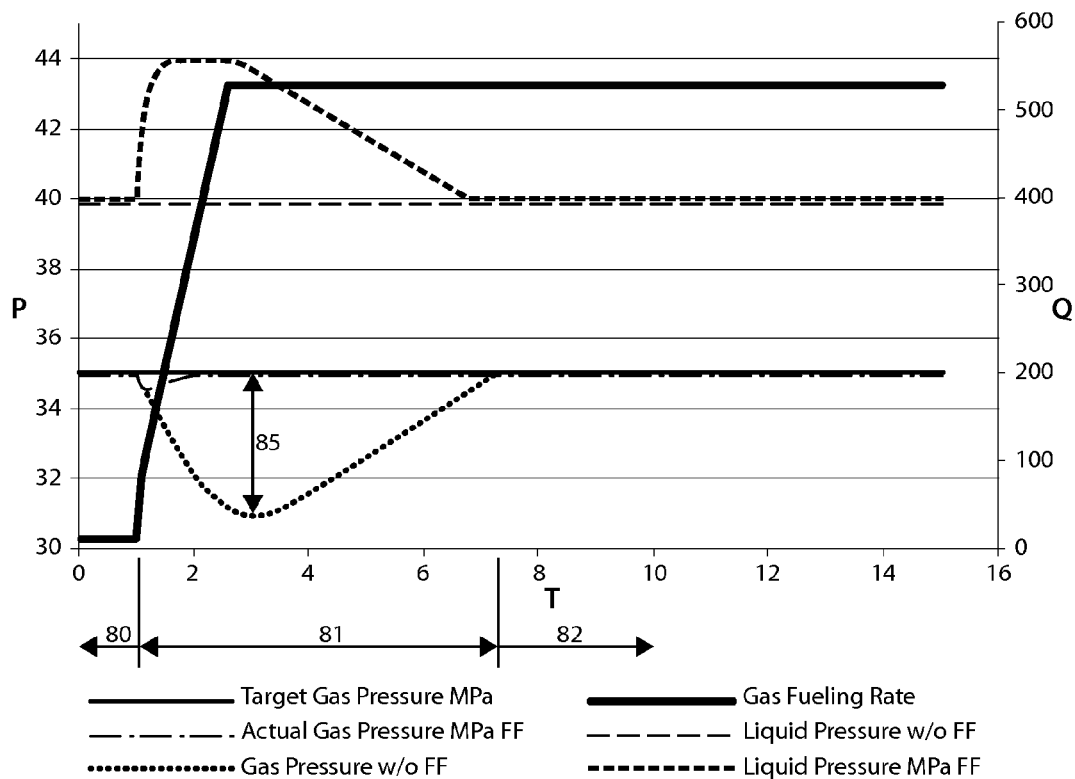
FIG. 7 is a graph of desired gas pressure (P), actual gas pressure (P), liquid diesel pressure (P), and gas fueling rate (Q), with (FF) and without (w/o FF) the feed forward pressure control strategy of the present disclosure, vs. time (T) for a transient event according to one aspect of the present disclosure.
Figure 8:
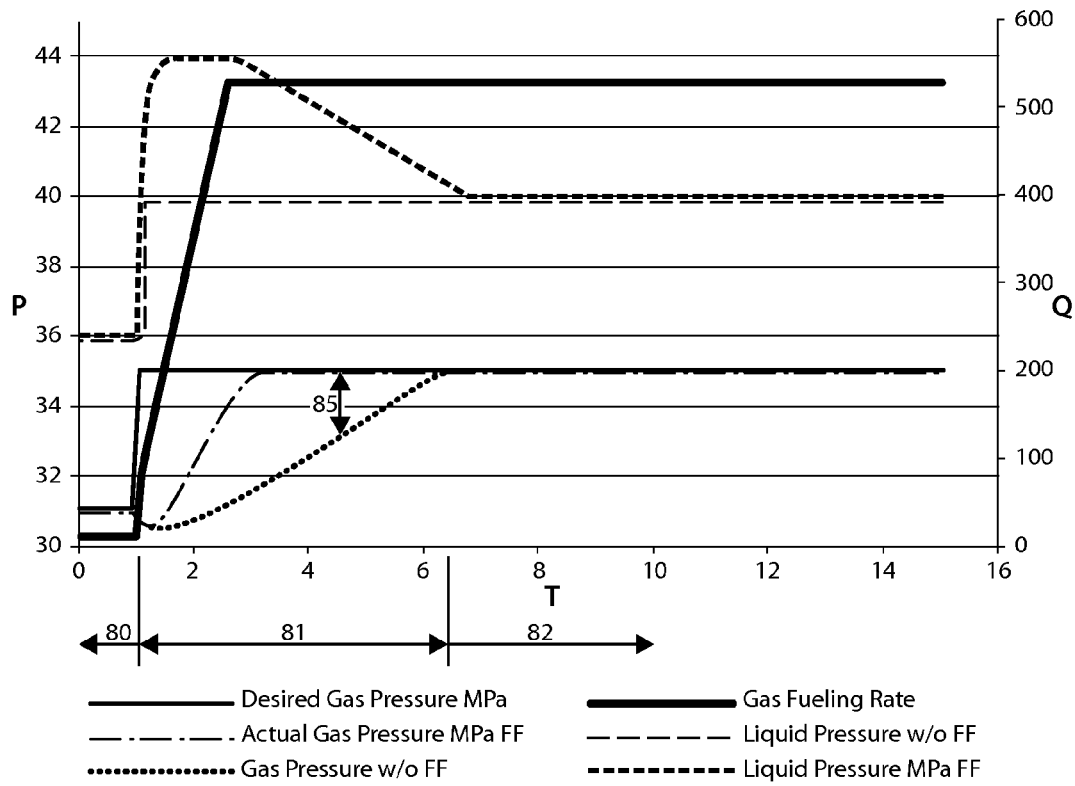
FIG. 8 is a graph of desired gas pressure (P), actual gas pressure (P), liquid diesel pressure (P), and gas fueling rate (Q), with (FF) and without (w/o FF) the feed forward pressure control strategy of the present disclosure, v. time (T) for a transient event according to another aspect of the present disclosure.

Referring to FIG. 7, an example scenario showing before, during and after a transient, with and without the teachings of the present disclosure, when the target rail pressures (gas and liquid) are the same before and after the transient. FIG. 8 shows a similar example before during and after a transient in which the target liquid and gas rail pressures before the transient are less than the target liquid and gas rail pressures after the transient. Those skilled in the art should note that although the strategy of the present disclosure seeks to obviate deficits in gas rail pressure during a fuel increasing transient, that does not mean that a gaseous rail pressure deficit is absolutely prevented. Nevertheless, the examples shown in FIGS. 7 and 8 show that the severity, if any, of a deficit in gaseous rail pressure is substantially lessened by utilizing the strategy of the present disclosure in which the gaseous fuel supply to the gaseous fuel common rail 40 is surged by temporarily increasing the liquid rail pressure to an elevated target pressure. Those skilled in the art will appreciate that the engine control maps may need to include separate liquid injection control signals associated with the elevated target liquid pressures during fuel increasing transients.

Referring specifically to FIG. 7, the lower time axis is broken up into a pre-transient time 80, a fueling increase transient 81 and a post transient 82. Prior to the transient 81, the liquid and gaseous rail pressures are controlled toward 40 and 35 MPa, respectively. At the beginning of transient 81, the gaseous fueling rate rapidly rises to change engine 20 from a low fuel demand of a first speed load toward a high fuel demand of a second speed and load. As stated earlier, the target gas and liquid rail pressures in this example are the same pre-transient 80 and post-transient 82. However, in order to avoid the gas pressure deficit 85 associated with the dotted line (w/o FF) the feed forward transient control algorithm of the present disclosure teaches surging the liquid rail pressure, maybe up to 44 MPa, responsive to the transient command in order to obviate the gas pressure deficit 85 associated with the dotted line. Nevertheless, this example shows that a small and brief, but acceptable, gas pressure deficit still occurs when employing the strategy of the present disclosure to proactively increase the mass flow rate of gaseous fuel supplied to the gaseous fuel common rail 40. An acceptable magnitude and duration of a gas pressure deficit may be somewhat of a design choice by deciding a magnitude to which the liquid rail pressure is surged during transient 81, but other issues such as pressure containment design constraints could also be implicated. In this example, without employing the feed forward transient control algorithm of the present disclosure, both the liquid and gas target pressures remain constant through the transient 81. The scenario illustrated in FIG. 7 may, for example, correspond to increasing engine speed while operating engine 20 in a substantially loaded condition.

Referring now specifically to FIG. 8, the lower time axis is again broken up into a pre-transient 80, a fueling increase transient 81 and a post transient 82. This example scenario differs from that a FIG. 7 in that the target gas and liquid rail pressures are both higher, post-transient 82 relative to pre-transient 80. This scenario, may correspond to engine 20 rapidly changing from a low speed and load to a rated speed and load condition. The lines representing the target liquid and gas pressures undergo a step increase at the beginning of transient 81. While the liquid rail pressure may be rapidly increased almost vertically due to the incompressible nature of liquid fuel and the quick response of high pressure pump 39, the gaseous rail pressure inherently includes some lag due in part to the compressible nature of the gaseous fuel. However, by surging the liquid rail pressure to an elevated target pressure during transient 81, the gas pressure deficit 85 associated with the dotted line without the strategy of the present disclosure is obviated, but not altogether eliminated. Those skilled in the art will appreciate that the shape of the gas pressure curve in attempting to track the target gas pressure during transient 81 may be somewhat of a design choice by choosing the magnitude of the elevated target liquid rail pressure during transient 81 and maybe also by selection of the specific hardware associated with gas supply devices 43 as well as metering valve 35.

By proactively increasing the mass flow of gaseous fuel to the gaseous fuel common rail 40 according to the present disclosure, the deficit between the actual gas pressure and the desired gas pressure during transient 81 can be obviated. This feed forward strategy renders the engine 20 and the associated gas pressure rail 40 more responsive to fueling increase transients than what would otherwise occur if no proactive strategy were utilized.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A method of operating an engine comprising the steps of:
injecting gaseous fuel and liquid fuel directly into an engine cylinder from a gaseous nozzle outlet set and a liquid nozzle outlet set, respectively, of a fuel injector;
compression igniting the injected liquid fuel to ignite the gaseous fuel;
commanding a transient from a low fuel demand of a first speed and load to a high fuel demand of a second speed and load;
obviating a deficit in a gaseous rail pressure during the transient by proactively increasing a mass flow rate of gaseous fuel to a gaseous fuel common rail responsive to the commanding step.

2. The method of claim 1 including:
controlling a liquid rail pressure toward a first liquid pressure based upon the first speed and load prior to the transient;
controlling the liquid rail pressure toward a second liquid pressure based upon the second speed and load after the transient; and
the increasing step is performed at least in part by controlling the liquid rail pressure toward a third liquid pressure, which is greater than the first liquid pressure and the second liquid pressure, during the transient.

3. The method of claim 2 wherein the first liquid rail pressure and the second liquid rail pressure are equal.

4. The method of claim 2 wherein the second liquid rail pressure is greater than the first liquid rail pressure.

5. The method of claim 1 wherein each liquid injection event during the transient corresponds to a predetermined minimum injection quantity; and
allocating a remainder of an engine fuel demand to injection of gaseous fuel during the transient.

6. The method of claim 5 including a step of controlling the gas rail pressure responsive to the liquid rail pressure before, during and after the transient.

7. The method of claim 6 including:
controlling a liquid rail pressure toward a first liquid pressure based upon the first speed and load prior to the transient;
controlling the liquid rail pressure toward a second liquid pressure based upon the second speed and load after the transient; and
the increasing step is performed at least in part by controlling the liquid rail pressure toward a third liquid pressure, which is greater than the first liquid pressure and the second liquid pressure, during the transient.

8. The method of claim 7 wherein each liquid injection event during the transient corresponds to a predetermined minimum injection quantity; and
allocating a remainder of an engine fuel demand to injection of gaseous fuel during the transient.

9. The method of claim 8 wherein the first liquid rail pressure and the second liquid rail pressure are equal.

10. The method of claim 8 wherein the second liquid rail pressure is greater than the first liquid rail pressure.

11. An engine that comprising:
an engine housing that defines a plurality of cylinders within which a plurality of respective pistons reciprocate to define a compression ratio greater the 14:1;
a gaseous fuel common rail and a liquid fuel common rail fluidly connected to each of a plurality of fuel injectors that each include a gaseous nozzle outlet set and a liquid nozzle outlet set positioned for direct injection into one of the cylinders;
an electronic controller configured to execute a feed forward transient control algorithm responsive to a commanded transient, and wherein the feed forward transient control algorithm is configured to obviate a deficit in a gaseous rail pressure during the transient by proactively increasing a mass flow rate of gaseous fuel to a gaseous fuel common rail;
wherein the transient includes changing from a low fuel demand of a first speed and load to a high fuel demand of a second speed and load.

12. The engine of claim 11 including the electronic controller being configured to execute a liquid pressure control algorithm to:
control a liquid rail pressure toward a first liquid pressure based upon the first speed and load prior to the transient;
control the liquid rail pressure toward a second liquid pressure based upon the second speed and load after the transient; and
the feed forward transient control algorithm is configured to control the liquid rail pressure toward a third liquid pressure, which is greater than the first liquid pressure and the second liquid pressure, during the transient.

13. The engine of claim 11 including a metering valve positioned between a gaseous fuel supply system and a gaseous fuel common rail, and including a variable flow area that changes responsive to changes in the liquid rail pressure.

14. The engine of claim 13 wherein the metering valve includes a pressure actuator fluidly connected to a liquid fuel common rail.

15. The engine of claim 11 wherein liquid injection events during the transient correspond to a predetermined minimum injection quantity; and
a remainder of an engine fuel demand is allocated to gaseous injection events during the transient.

16. The engine of claim 12 wherein the first liquid rail pressure and the second liquid rail pressure are equal.

17. The engine of claim 12 wherein the second liquid rail pressure is greater than the first liquid rail pressure.

18. The engine of claim 12 including a metering valve positioned between a gaseous fuel supply system and a gaseous fuel common rail, and including a variable flow area that changes responsive to changes in the liquid rail pressure.

19. The engine of claim 18 wherein the metering valve includes a pressure actuator fluidly connected to a liquid fuel common rail.

20. The engine of claim 19 wherein liquid injection events during the transient correspond to a predetermined minimum injection quantity; and
a remainder of an engine fuel demand is allocated to gaseous injection events during the transient.

* * * * *